(12) United States Patent
McLean

(10) Patent No.: US 10,913,250 B2
(45) Date of Patent: Feb. 9, 2021

(54) UNIVERSAL STORAGE AND ATTACHMENT DEVICE

(71) Applicant: JSB Creations LLC, San Antonio, TX (US)

(72) Inventor: Scott McLean, Indialantic, FL (US)

(73) Assignee: JSB Creations, LLC, Indialantic, FL (US)

( * ) Notice: Subject to any disclaimer, the term of this patent is extended or adjusted under 35 U.S.C. 154(b) by 408 days.

(21) Appl. No.: 15/876,341

(22) Filed: Jan. 22, 2018

(65) Prior Publication Data

US 2018/0207919 A1  Jul. 26, 2018

Related U.S. Application Data

(60) Provisional application No. 62/449,775, filed on Jan. 24, 2017.

(51) Int. Cl.
| | |
|---|---|
| *B32B 1/08* | (2006.01) |
| *B65D 90/00* | (2006.01) |
| *B32B 27/30* | (2006.01) |
| *F16B 2/10* | (2006.01) |
| *F16B 2/22* | (2006.01) |
| *B65D 90/12* | (2006.01) |

(52) U.S. Cl.
CPC ............ *B32B 27/304* (2013.01); *B32B 1/08* (2013.01); *B65D 90/00* (2013.01); *B65D 90/004* (2013.01); *F16B 2/10* (2013.01); *F16B 2/22* (2013.01); *B65D 90/125* (2013.01)

(58) Field of Classification Search
CPC .. B32B 1/02; B32B 1/08; B65D 90/00; B65D 90/004
See application file for complete search history.

(56) References Cited

U.S. PATENT DOCUMENTS

| | | |
|---|---|---|
| 5,915,572 A | 6/1999 | Hancock |
| 6,588,637 B2 | 7/2003 | Gates et al. |

*Primary Examiner* — Walter Aughenbaugh
(74) *Attorney, Agent, or Firm* — Daniel C. Pierron; Widerman Malek, PL

(57) ABSTRACT

An attachment device comprising a base and a body section extending from the base and comprising two opposing arms. Each arm comprises a displacement limiting section and an interfacing surface member. The arms cooperate to define an opening and are configured to be displaced by an object positioned within the opening and interfacing with the interfacing surface members. Furthermore, the arms are configured to exert a compressive force on the object placed in the opening as a result of the displacement thereof.

18 Claims, 3 Drawing Sheets

UNIVERSAL STORAGE AND ATTACHMENT DEVICE

RELATED APPLICATIONS

This application claims the benefit under 35 U.S.C. § 119(e) of U.S. Provisional Patent Application Ser. No. 62/449,775 filed on Jan. 24, 2018 and titled Universal Storage and Attachment Device, the entire content of which is incorporated herein by reference.

FIELD OF THE INVENTION

The present invention relates to systems and methods for securely storing various items

BACKGROUND

The storage of items in a manner that facilitates quick securement of the item and retrieval, without complicated securing mechanisms, is a persistent everyday problem. The design of such storage systems requires a compromise between accessibility, reliability, and durability. Current solutions tend to either be relatively inaccessible, requiring complicated securing mechanisms that require additional time in effort in both the storage and retrieval of items, relatively unreliable, establishing an inadequate securement of the item and resulting in the unintentional detachment of the item from the storage system, or lacking in durability, failing due to use of moving parts. Accordingly, there is a need in the art for a storage device that facilitates convenient and adequate storage of items.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an attachment device comprising a base and a body section extending from the base and comprising two opposing arms. Each arm may comprise a displacement limiting section and an interfacing surface member. The arms may cooperate to define an opening. And may be configured to be displaced by an object positioned within the opening and interfacing with the interfacing surface members. Furthermore, the arms may be configured to exert a compressive force on the object placed in the opening as a result of the displacement thereof.

In some embodiments, the body section may be formed from at least one of metals, metal alloys, ceramics, and polymers. Specifically, the body section may be formed from polyvinyl chloride.

In some embodiments, the displacement limiting section may be configured to prevent the displacement of the arms beyond a maximum displacement. The displacement limiting section may comprise at least one of a curled section, a vertical extension, and a lateral extension. Furthermore, the displacement limiting section may curl away from the opening.

In some embodiments, the interfacing surface member may have a coefficient of stiffness different from the rest of the body section. The interfacing surface member may be formed of a material having a coefficient of stiffness that is less than a coefficient of stiffness of a material forming the rest of the body section. In some embodiments, the interfacing surface member may be formed of semi-rigid polyvinyl chloride. In some embodiments, the interfacing surface member may comprise ethylene-vinyl acetate foam.

In some embodiments, the interfacing surface member may have a greater coefficient of friction than the arms. In some embodiments, the arms may be generally arcuate. In some embodiments, the base and at least a portion of the body section may be integrally formed as a single integral structure.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
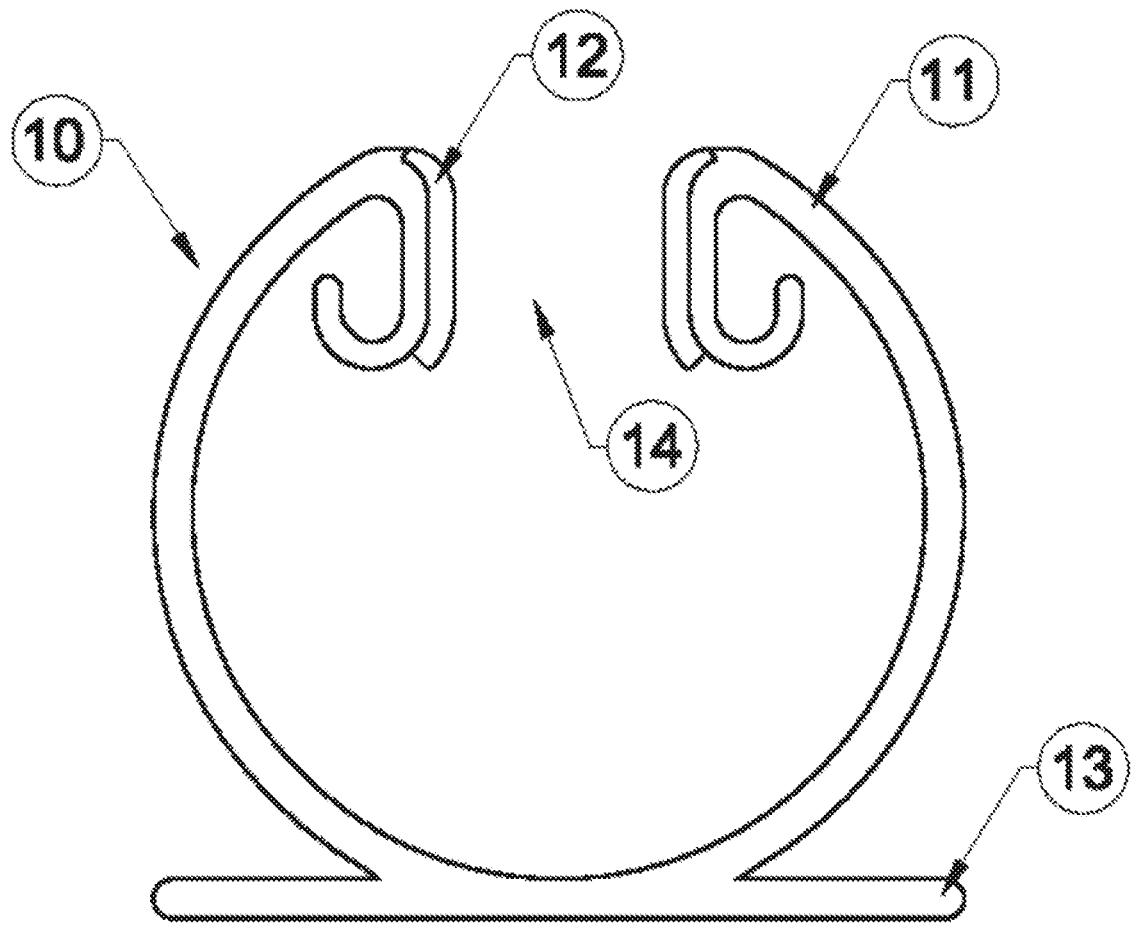
FIG. 1 is a front elevation view of a universal storage and securing device according to an embodiment of the invention
Figure 2:
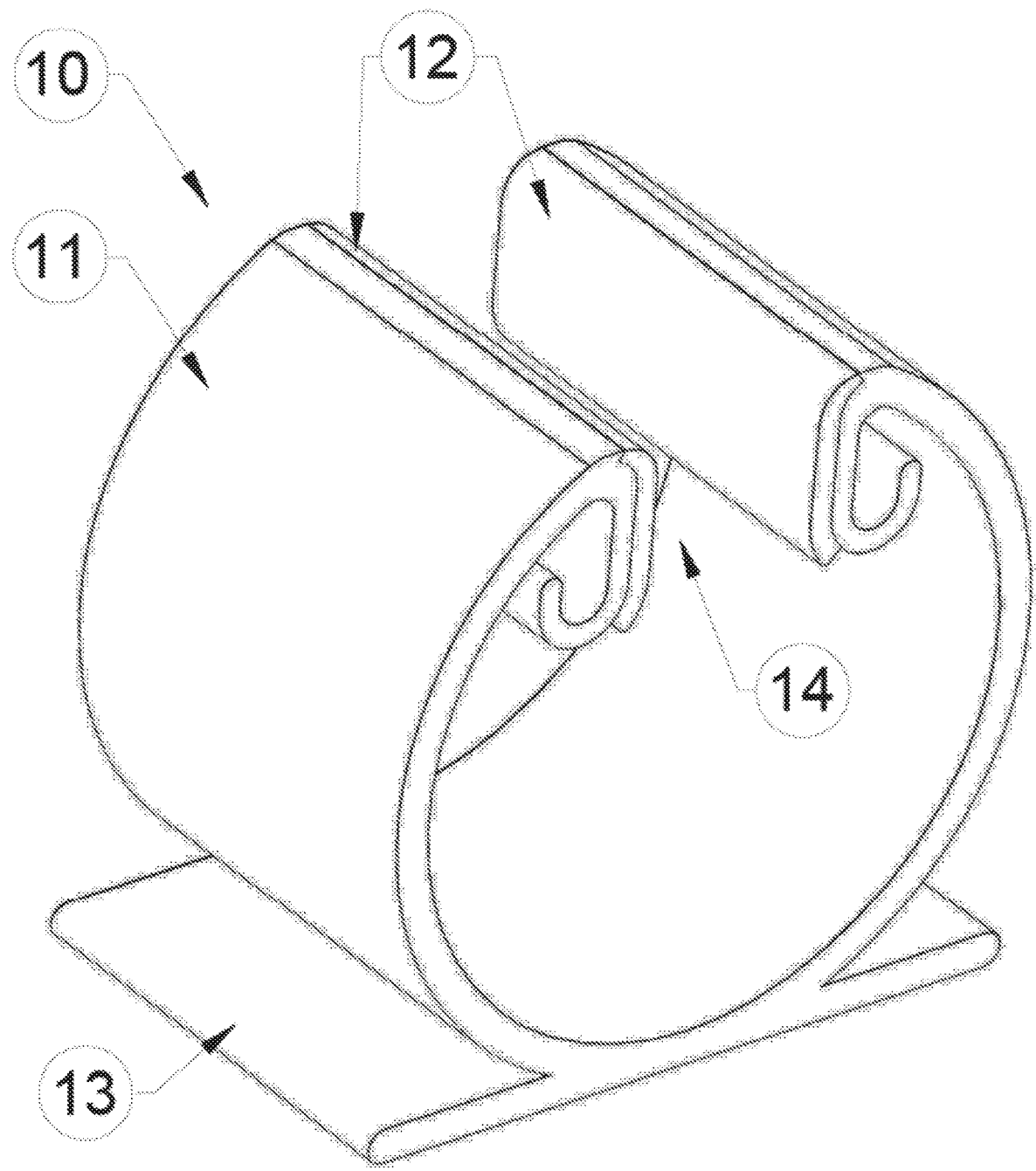
FIG. 2 is a perspective view of the universal storage and secure device of FIG. 1.

The present disclosure is to be considered as an exemplification of the invention and is not intended to limit the invention to the specific embodiments illustrated by the figures or description below. Referring now to the invention in more detail, in FIG. 1 and FIG. 2, an embodiment of a universal storage and holding device (USHD) 10 is presented. The USHD 10 may comprise a body section 11, defining an opening 14 between two opposing arms of the body section 11 for receiving objects to be stored or held and a base 13 for mounting said invention to a substrate. The arms may be generally arcuate.

In some embodiments, the body section 11 and the base 13 may be formed as a single integral structure. In some alternative embodiments, the body section 11 may be formed separately from the base 13 and then joined together by any suitable means or method as is known in the art, including, but not limited to, adhesives, glues, welding, reflowing, fasteners, and the like. The attachment/integral formation between the body section 11 and the base 13 may be of sufficient strength to prevent the relative movement there between and prevent the coming apart of the two elements when an object is supported by the USHD 10.

In the present invention, the base 13 is generally flat. Such a configuration facilitates the attachment of the base 13 to a substrate, such as a structural surface. The base 13 may facilitate attachment by any means or method known in the art, including, but limited to, adhesives, glues, fasteners, and the like. In some embodiments, the base 13 may comprise at least one of a suction cup or device, a magnet, a static cling feature, or other feature that may facilitate the attachment of the base 13 to a substrate.

The body section 11 may be formed of a material of sufficient stiffness that when an object is positioned within the opening 14 and displaces the opposing arms of the body section 11, the body section 11 may exert a compressive force on the object displacing the opposing arms. The material forming the body section 11 may be selected based on a stiffness coefficient thereof, such that the body section 11 may be designed to permit more or less displacement thereof and/or exert a greater compressive force with more or less displacement. The body section 11 may be formed of metals, metal alloys, ceramics, plastics, and other polymers, including, but not limited to, polyvinyl chloride (PVC).

Additionally, the body section 11 may be formed to include features that prevent the over-displacement thereof. In the present embodiment, the body section 11 comprises a displacement limiting section that, when an object placed in the opening 14 displaces the opposing arms of the body section 11 to a maximum displacement, interfaces with another section of the body section to impede further displacement of the body section 11. In the present embodiment, the displacement limiting section is a curled portion at the end of the opposing arms of the body section 11, the curled section curling away from the opening 14 and toward the opposing arms of the body section 11. Other structural configurations that may impede over-displacement are contemplated and included within the scope of the invention, including, but not limited to, lateral extensions, vertical extensions, and the like The interfacing surface members 12 may be positioned on a portion of the body section 11 generally adjacent to the opening 14, such as on portions of the opposing arms of the body section 11. The interfacing surface members 12 may be formed of a material so as to prevent the relevant movement between the USHD 10 and the object being held thereby. In some embodiments, the interfacing surface members 12 may be formed of a material having relatively higher static and/or kinetic coefficients of friction, or be textured, configured, or otherwise include geometric characteristics configured to produce higher static and/or kinetic coefficients of friction.

The interfacing surface members 12 may also be configured to have different coefficients of stiffness as compared to the material forming the other parts of the body section. As an example, the interfacing surface members 12 may be formed of a semi-rigid PVC, that is to say a PVC having a lower stiffness coefficient relative to that of the PVC comprised by the opposing arms of the body section 11. This improves the interfacing between the interfacing surface members 12 and the object positioned within the opening 14.

The interfacing surface members 12 may be positioned on the body section by any means or method known in the art. In some embodiments, the interfacing surface members 12 may be attached by the use of glues, adhesives, welding, interference fits, thermal treatment, fasteners, co-extrusion, and the like. In some embodiments, the interfacing surface members 12 may be formed from a portion of the body section 11 by treating, manipulating, working, or otherwise changing the physical characteristics of that portion of the body section 11.

The USHD 10 may be configured to secure and hold an object by exerting a compressive force on the item resulting from the shape of the USHD 10. Accordingly, the USHD 10 may have a geometric configuration that increases a resulting compressive force exerted by the USHD 10 on the object when an object is placed within the opening 14 and displaces the opposing arms of the body section 11. In the present invention, the USHD 10, and more particularly, the body section 11 has a generally circular configuration. It is contemplated and included within the scope of the invention that while the body section 11 is described is circular, that does not in any way prevent or preclude portions of the body section 11 from departing from having a geometric configuration of something other than a circle. Other geometric configurations contemplated, of both the body section 11 generally and portions thereof, include, but are not limited to, triangles, rectangles, trapezoids, parallelograms, and any other regular or irregular polygon.

Figure 3:
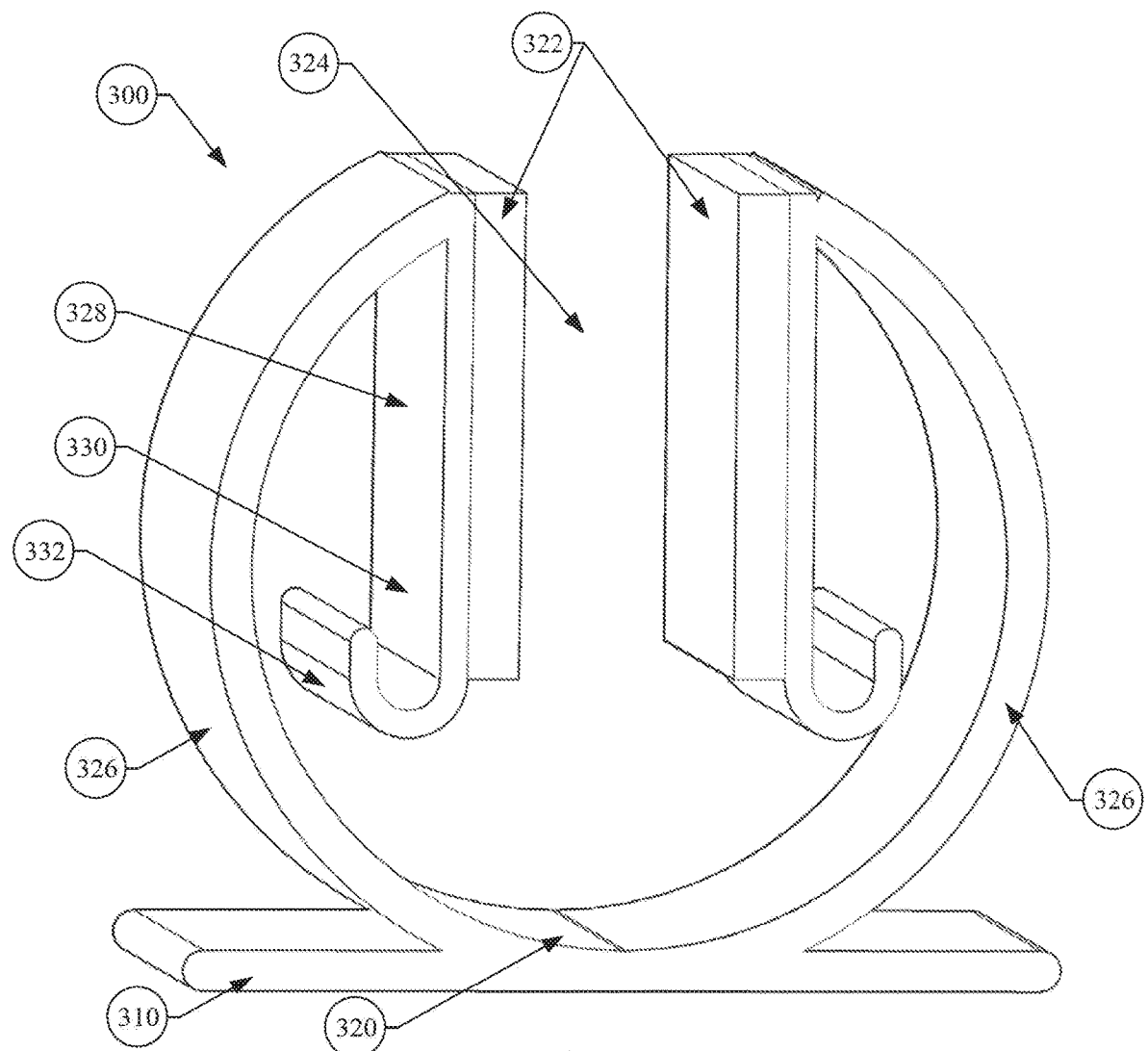
FIG. 3 is a front perspective view of a universal storage and securing device according to an embodiment of the invention.

Referring now to FIG. 3, a USHD 300 according to an embodiment of the invention is presented. The USHD 300 may comprise a base 310 and a body section 320 having similarities to the USHD 10 of FIGS. 1-2. The body section 320 comprises an interfacing surface member 322 that comprises a foam-type material extending into an opening 324 defined by opposing arms 326 of the body section 320. Moreover, each arm 326 comprises a displacement limiting section 328 comprising a vertical extension 330 extending generally downward from an upper section of the arm 326 and a curled section 332 at a lower end of the vertical extension 330. The interfacing surface member 322 may be attached to the displacement limiting section 328, more specifically to at least a portion of, and optionally the entirety of so as to be coextensive with, the vertical extension 330, and extend into the opening 324 therefrom. The interfacing surface member 322 may be configured to be compressed between an object positioned within the opening 324 and the displacement limiting section 328, exerting a force onto the object positioned within the opening 324 to facilitate securement of the object by clamping the object between opposing interfacing surface members 322 of the arms 326. In some embodiments, the interfacing surface members 322 may comprise ethylene-vinyl acetate foam Advantages of the present invention include, without limitation:
 a) it is a simple design that has no moving parts that could potentially fail;

b) it can be applied to many different applications;
c) the invention can be created in wide variety of sizes to accommodate a broad spectrum of size possibilities; and
d) the material composition is long lasting and is able to be used indoors or outdoors.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. An attachment device comprising:
a base;
a body section extending from the base and comprising two opposing arms, each arm comprising:
a displacement limiting section; and
an interfacing surface member;
wherein the arms cooperate to define an opening;
wherein the arms are configured to be displaced by an object positioned within the opening and interfacing with the interfacing surface members; and
wherein the arms are configured to exert a compressive force on the object placed in the opening as a result of the displacement thereof.

2. The attachment device of claim 1 wherein the body section is formed from at least one of metals, metal alloys, ceramics, and polymers.

3. The attachment device of claim 2 wherein the body section is formed from polyvinyl chloride.

4. The attachment device according to claim 1 wherein the displacement limiting section is configured to prevent the displacement of the arms beyond a maximum displacement.

5. The attachment device of claim 4 wherein the displacement limiting section comprises at least one of a curled section, a vertical extension, and a lateral extension.

6. The attachment device of claim 5 wherein the displacement limiting section comprises a curled section that curls away from the opening.

7. The attachment device of claim 1 wherein the interfacing surface member has a coefficient of stiffness different from the rest of the body section.

8. The attachment device of claim 7 wherein the interfacing surface member is formed of a material having a coefficient of stiffness that is less than a coefficient of stiffness of a material forming the rest of the body section.

9. The attachment device of claim 1 wherein the interfacing surface member has a greater coefficient of friction than other portions of the arms.

10. The attachment device of claim 1 wherein the interfacing surface member comprises ethylene-vinyl acetate foam.

11. The attachment device of claim 1 wherein the base and at least a portion of the body section are integrally formed as a single integral structure.

12. An attachment device comprising:
a base;
a body section extending from the base and comprising two opposing arms, each arm comprising:
a displacement limiting section; and
an interfacing surface member;
wherein the arms cooperate to define an opening;
wherein the displacement limiting section is configured to prevent the displacement of the arms beyond a maximum displacement
wherein the displacement limiting section comprises a curled section that curls away from the opening;
wherein the interfacing surface member has a coefficient of stiffness different from the rest of the body section;
wherein the arms are configured to be displaced by an object positioned within the opening and interfacing with the interfacing surface members; and
wherein the arms are configured to exert a compressive force on the object placed in the opening as a result of the displacement thereof.

13. The attachment device of claim 12 wherein the interfacing surface member is formed of a material having a coefficient of stiffness that is less than a coefficient of stiffness of a material forming the rest of the body section.

14. The attachment device of claim 12 wherein the interfacing surface member has a greater coefficient of friction than other portions of the arms.

15. The attachment device of claim 12 wherein the interfacing surface member comprises ethylene-vinyl acetate foam.

16. The attachment device of claim 12 wherein the body section is formed from polyvinyl chloride.

17. The attachment device of claim 12 wherein the base and at least a portion of the body section are integrally formed as a single integral structure.

18. An attachment device comprising:
a base;
a body section extending from the base and comprising two opposing arcuate arms, each arm comprising:
a displacement limiting section; and
an interfacing surface member;
wherein the arms cooperate to define an opening;
wherein the displacement limiting section is configured to prevent the displacement of the arms beyond a maximum displacement;
wherein the displacement limiting section comprises a downward extension and a curled section that curls away from the opening;

wherein the interfacing surface member has a coefficient of stiffness less than the rest of the body section and a coefficient of friction greater than other portions of the arms;
herein the arms are configured to be displaced by an object positioned within the opening and interfacing with the interfacing surface members;
wherein the arms are configured to exert a compressive force on the object placed in the opening as a result of the displacement thereof; and
wherein the base and at least a portion of the body section are integrally formed as a single integral structure.

* * * * *